(12) United States Patent
Novack

(10) Patent No.: US 6,594,948 B1
(45) Date of Patent: Jul. 22, 2003

(54) BAIT STATION

(75) Inventor: Michael W. Novack, Acworth, GA (US)

(73) Assignee: Acuity Brands, Inc., Atlanta, GA (US)

( * ) Notice: Subject to any disclaimer, the term of this patent is extended or adjusted under 35 U.S.C. 154(b) by 0 days.

(21) Appl. No.: 10/078,094

(22) Filed: Feb. 15, 2002

(51) Int. Cl.[7] .............................................. A01M 1/20
(52) U.S. Cl. ........................................... 43/131; 43/121
(58) Field of Search .............. 43/131, 121; A01M 1/20

(56) References Cited

U.S. PATENT DOCUMENTS

| | | | |
|---|---|---|---|
| 761,195 A | 5/1904 | Rosshard | |
| 1,700,517 A | 1/1929 | Ross | |
| 1,856,200 A | 5/1932 | Tippey | |
| 3,008,262 A | * 11/1961 | Ronicker | 43/131 |
| 4,251,946 A | * 2/1981 | Lindley | 43/131 |
| 4,277,907 A | 7/1981 | Ernest | |
| 4,761,912 A | * 8/1988 | Dyer et al. | 43/121 |
| 4,782,621 A | * 11/1988 | Wissman | 43/131 |
| 4,793,093 A | 12/1988 | Gentile | 43/131 |
| 4,894,947 A | 1/1990 | Brandli | 43/131 |
| 5,033,229 A | 7/1991 | Demarest et al. | 43/131 |
| 5,048,225 A | 9/1991 | Brandli | 43/131 |
| 5,119,586 A | 6/1992 | Townsend | 43/114 |
| 5,123,202 A | 6/1992 | Tanisake | 43/131 |
| 5,239,772 A | 8/1993 | Burian et al. | 43/131 |
| 5,310,552 A | 5/1994 | Gunner et al. | 424/93 Q |
| 5,357,709 A | 10/1994 | Lin | 43/131 |
| 5,427,784 A | 6/1995 | Gunner et al. | 424/93.5 |
| 5,548,922 A | 8/1996 | Wefler | 43/131 |
| 5,802,761 A | * 9/1998 | Demarest et al. | 43/131 |
| 5,873,193 A | 2/1999 | Jensen | 43/131 |
| 5,943,816 A | 8/1999 | Hyatt et al. | 43/131 |
| 5,953,854 A | * 9/1999 | Hyatt | 43/131 |
| 5,960,585 A | * 10/1999 | Demarest et al. | 43/131 |
| 5,983,558 A | * 11/1999 | Las et al. | 43/131 |
| 6,216,384 B1 | * 4/2001 | Dickson et al. | 43/131 |
| 6,219,960 B1 | * 4/2001 | Contadini et al. | 43/121 |
| 6,272,791 B1 | * 8/2001 | Pleasants | 43/131 |
| 2001/0025447 A1 | 10/2001 | Nimocks, III | 43/131 |

FOREIGN PATENT DOCUMENTS

| | | | |
|---|---|---|---|
| EP | 0658306 A1 | 6/1995 | A01M/1/20 |
| GB | 2095965 A | 10/1982 | A01M/1/20 |
| GB | 2128463 A | 5/1984 | A01M/1/20 |
| JP | 404247003 A | 9/1992 | A01N/59/14 |
| JP | 406078655 A | 3/1994 | A01M/1/20 |
| JP | 409131154 A | 5/1997 | A01M/1/20 |
| JP | 411346626 A | 12/1999 | A01M/1/20 |
| JP | 2001131005 A | 5/2001 | A01N/25/34 |
| WO | WO 94/22297 | 10/1994 | A01M/1/20 |

* cited by examiner

Primary Examiner—Charles T. Jordan
Assistant Examiner—Susan C. Alimenti
(74) Attorney, Agent, or Firm—Needle & Rosenberg, P.C.

(57) ABSTRACT

A bait station is disclosed, having a base section with a floor and a continuous upstanding sidewall extending along the periphery thereof. A cap is constructed and arranged to be received on the base section in a snap-fit. At least one opening is defined within the sidewall of the base section, and a bait cup is disposed therein. An annular ridge is formed on the exterior of the base section sidewall, the cap having a correspondingly sized and shaped flange for being passed thereover to snap-fit the cap on the base section. The base section may also have a flange passing about the sidewall and extending radially away therefrom, which flange is sized and shaped to receive a leading edge of the cap thereon when the cap is snap-fit to the base section. The sidewall flange includes a separate upstanding sidewall extending thereal-ong for defining a channel sized to receive the leading edge of the cap therein.

30 Claims, 5 Drawing Sheets

BAIT STATION

FIELD OF THE INVENTION

The invention relates in general to bait stations. More particularly, the invention relates to a bait station constructed of a base section in which a bait cup is disposed for holding the desired insect bait, and a separate cap piece which is constructed and arranged to be snap-fit onto the base section of the bait station in a tamper-resistant manner.

BACKGROUND OF THE INVENTION

Bait stations for use in the treatment of insect and vermin infestation are well known. Common to insect bait stations is a housing of some type in which a bait is placed, a means for permitting insect access through the housing to the bait, and a housing cover or lid received on the bait station housing for sealing the insect bait therein. Additionally, some bait stations have openings or passages defined within the sidewall of the housing to allow insects to readily pass therethrough and gain access to the bait, while other bait station designs are constructed to have a maze-like passage for directing the insects therethrough and to the bait. Over the years, a great many bait station designs have been developed.

An early example of a bait station is the roach exterminator of U.S. Pat. No. 1,700,517 to Ross. The roach exterminator of Ross has a pasteboard housing with an upwardly extending sidewall having a series of openings defined therein for allowing the roaches, or other insects, to pass into the interior portion of the housing, in which a bait cup is positioned. A correspondingly shaped pasteboard cover is provided for being slidably and rotatably fit to the housing, the cover having a corresponding number of openings defined in the sidewall of the cover such that the cover can be rotated on the housing for opening and closing the openings therein.

Another early example of an insect bait station is the insect trap of U.S. Pat. No. 1,856,200 to Tippey, as illustrated in FIGS. 1 through 3 thereof. Again, the bait station is comprised of a housing or receptacle open at its upper end, as defined by an upstanding sidewall, and having a series of openings defined therein for allowing passage of the insects therethrough. Bait is placed within the receptacle, and thereafter a cover is placed on the base for sealing the bait therein.

Yet another insect bait station is disclosed in U.S. Pat. No. 3,286,872 to Burdick, which discloses an expandable box with a non-removable cover in FIGS. 1–6 thereof. The device of Burdick is provided with a boxed bottom section and a correspondingly sized and shaped cover section. The cover is placed on the bottom section, and thereafter a top edge of the bottom section sidewall is deformed such that the cover cannot be removed from the bottom, but is otherwise slidably affixed thereto for opening and closing a series of openings defined in the sidewall of the bottom section. Although Burdick refers to his device as being adapted for use as an ant trap, nothing is disclosed in the '872 patent with respect to how the trap is baited, however, or whether a bait is used at all.

A more recent example of a bait station is disclosed in U.S. Pat. No. 4,793,093 to Gentile, which discloses a feeding station for vermin having a base in which a series of ramps or pathways is defined so that insects pass therethrough toward a centrally located bait, with a cover that is passed over the base and adapted to seal the openings within the base once closed thereon.

U.S. Pat. No. 5,953,854 to Hyatt discloses a granular bait station having an opening defined in the floor of a bottom portion of the trap so that insects, for example ants, can enter therethrough in order to access to the interior of the trap, whereupon they can withdraw a granular bait and return it to their nest. A separate cover is provided which is fit to the open top portion of the bottom of the bait station.

Still another bait station is disclosed in U.S. Pat. No. 6,219,960 B1 to Contadini et al., in which the bait station is comprised of a housing having a stake extending therefrom for positioning the housing on a soil surface, with a separate bait receiving or holding cartridge fit within the housing, and a cover passed over the housing for sealing the bait therein. Openings are defined in the bottom floor of the housing for allowing insects access to the cartridge and bait held within the bait station.

Numerous examples of bait stations of the type disclosed in U.S. Pat. No. 6,216,384 B1 to Dickson et al. also exist, in which an inexpensively formed bait station, for example a thermo-formed or thermo-set housing, is provided with a base, a bait, and a cover permanently affixed thereto for securing the bait therein.

What is needed, but seemingly unavailable in the art, is an insect bait station formed of a minimal number of parts, for example a base and a cap, the base having an integral bait cup or bait holder formed as a part thereof, where the cap can be securely received on the base in a tamper-resistant fashion, and where the sidewalls of the base support the cap once received thereon such that numerous ones of the bait station can be stacked one atop the other for storage during and after manufacture, or once baited and prepared for packaging, shipment, and use.

SUMMARY OF THE INVENTION

The present invention provides an improved bait station which overcomes some of the design deficiencies of the bait stations known in the art, and which is suited for use in treating insect and vermin infestations. The inventive bait station comprises a base section having a floor with a continuous upstanding sidewall extending along the periphery thereof, with at least one opening defined within the sidewall of the base section. A bait cup is disposed on the floor of the base section, and a cap is provided which is constructed and arranged to be received on the base section in a snap-fit. So constructed, the bait station of the instant invention can be quickly manufactured, for example by an injection molding process, a bait can be placed therein, and the cap quickly and easily affixed to the base section thereof.

The bait cup disposed within the base section is preferably formed as a part of the floor itself, and is provided with a frustoconical outer sidewall extending upwardly from the floor of the base section for defining a bait receiving cavity thereby. The frustoconical sidewall of the bait cup may be spaced from the sidewall of the base section for allowing insects to gain easy access to the interior of the bait station prior to climbing upward toward the insecticide or pesticide placed within the bait cup. Preferably, the sidewall of the bait station is provided with a radially spaced series of openings defined therein for allowing insects ready access to the bait. The base section sidewall openings may be of any desired shape and size, and thus may be tailored for the size of the insect or vermin for which the trap is to be used.

Additionally, the bait station comprises an annular ridge formed on the exterior surface of the sidewall of the base section and spaced from the floor thereof. The annular ridge extends at least partially about the sidewall of the base section, and the cap has an annular flange sized and shaped to be passed over the annular ridge for locking the cap on the base section in the snap-fit. The annular ridge formed on the exterior surface of the base section sidewall may be formed as a series of radially spaced ridge segments if so desired, or may be formed continuously.

The base section further comprises a flange formed on the exterior of the base section sidewall and extending radially away therefrom. The flange is spaced from the floor of the base section, and is positioned with respect to, i.e., spaced from, the annular ridge defined on the sidewall of the base section. So provided, when the cap is snap-fit to the base section, a leading edge of the cap is received against the flange so that the flange in concert with the sidewall of the base section will support the cap above the bait cup. Multiple bait stations may thus be stacked atop one another if, and as, desired. Additionally, this feature acts to "seal" the cap to the base to enhance the tamper-resistance of the assembled bait station.

An additional feature of the bait station is the provision of a continuous upstanding sidewall extending along the periphery of the flange extending from the base section sidewall. The flange and its sidewall together define a channel for receiving the leading edge of the cap therein to make the bait station further tamper-resistant by protecting or denying access to the leading edge of the cap so that, for example, a child would not be able to insert a knife or a screwdriver between the leading edge of the cap and the flange in order to try to pry or lever the cap off of the base section once snap-fit thereto so as to gain access to the bait within the station.

The cap is comprised of a planar member and a continuous sidewall extending along the periphery of the planar member and away therefrom, the leading edge of the cap extending along the periphery of the cap sidewall spaced from the planar member. The annular flange of the cap which is sized and shaped to be passed over the annular ridge on the base section sidewall is defined on the interior sidewall of the cap, and is spaced intermediate the leading edge of the cap and the planar member thereof. The cap may further include a lip extending along the periphery of the planar member opposite the cap sidewall, the lip defining a recessed surface on the planar member of the cap adapted for receiving product labeling or marking(s) thereon. This lip, which extends about the "top" flat portion of the cap planar member, is also used to strengthen the cap so that it does not become too flexible during the handling and placement of the cap on the base section during the bait station fabrication process.

The bait station is preferably formed of a plastic, for example polyethylene or polypropylene, and is preferably made in an injection molding process for ease and efficiency of manufacture. The bait station may, however, be formed of any conventional material suitable for use in handling insecticides or pesticides, and suitable also for use in either indoor and outdoor service environments, and capable of being manufactured through any of the known manufacturing processes.

Constructed of a plastic, preferably, the cap sidewall is constructed and arranged to be yieldably passed over the base section sidewall ridge, or ridges, and into the snap-fit for receiving the cap on the base section of the bait station. Accordingly, the cap is manufactured of a resilient material, which may again comprise polyethylene or polypropylene, capable of being yieldably passed over the base section sidewall ridge, and resiliently snapped or passed back into its original shape for sealing the cap in its snap-fit on the base section.

Constructed as described above, the sidewall of the cap is passed about and at least partially along the base section sidewall when the cap is snap-fit to the base section. So snap-fit, the planar member of the cap is received on and supported by the base section sidewall, and more preferably a top edge thereof extending continuously along the periphery of the base section sidewall. This, in fashion heretofore unknown in the art, allows the bait station to carry a greater load thereon as any forces on the cap are transmitted from the cap directly to the sidewall of the base section rather than on that portion of the cap passing over the open top of the base section, and in particular the bait cup disposed within the base section. In this fashion, the cap distributes any loads placed thereon along the base section sidewall so that the cap will not be otherwise punctured, ruptured, or torn should a load be placed thereon, nor that the cap would be deformed so as to allow the cap to come into contact with the insecticide, or force the insecticide or pesticide placed within the bait cup of the bait station through the openings defined within the sidewall of the base section.

It is an object, therefore, of the present invention to provide an improved insect bait station. It is to this object, as well as the other objects, features, and advantages of the present invention, which will become apparent upon reading the specification, when taken in conjunction with the accompanying drawings, to which the invention is directed.

DETAILED DESCRIPTION

Figure 1:
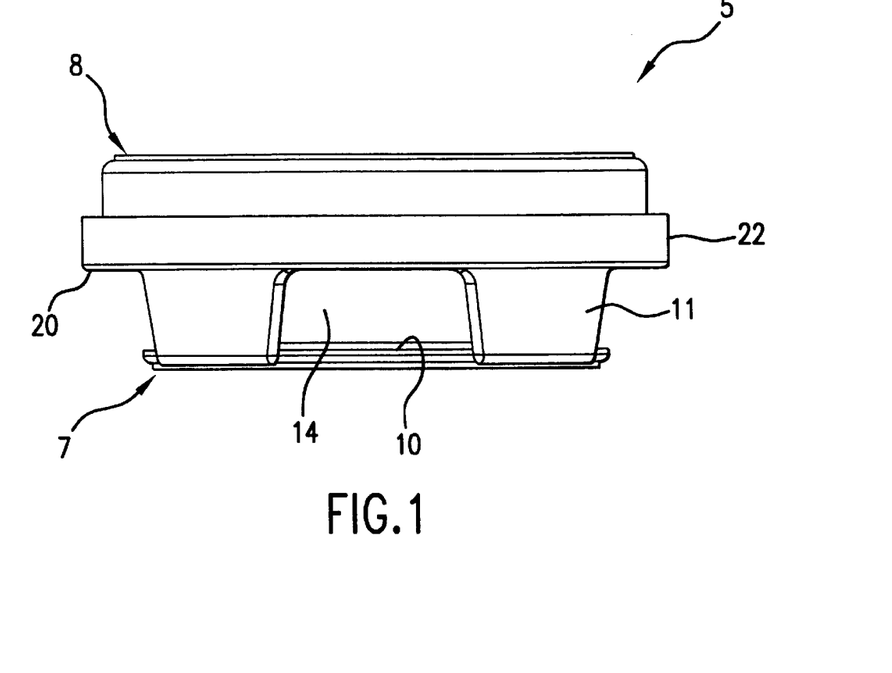
FIG. 1 is a side elevational view of a preferred embodiment of the bait station illustrating a base section thereof with a cap received on the base section.
Figure 2:
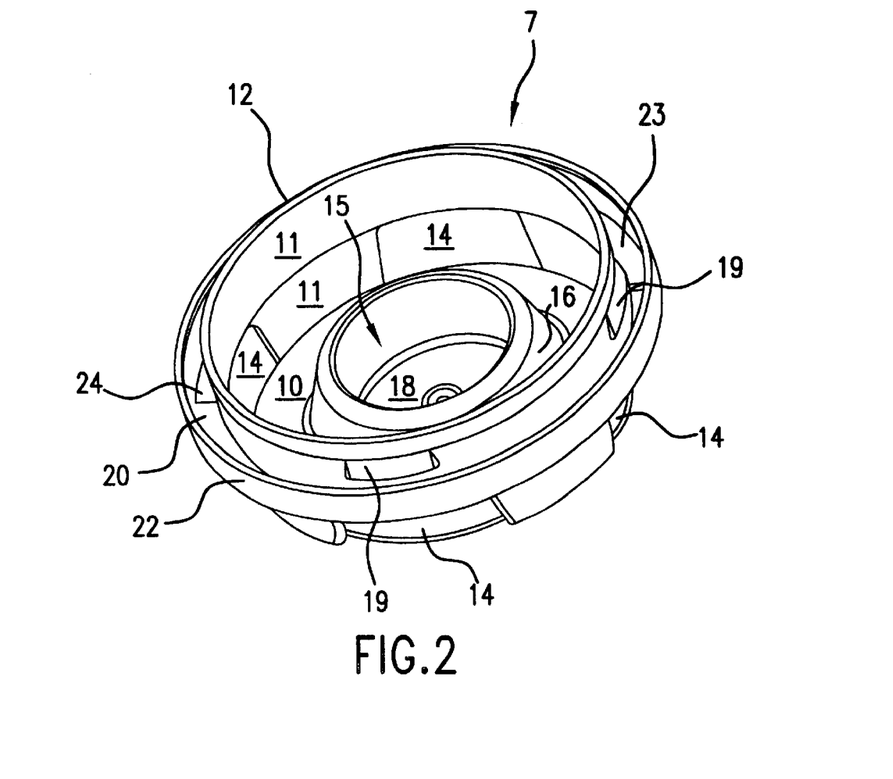
FIG. 2 is a perspective view of the base section of the bait station of FIG. 1.
Figure 3:
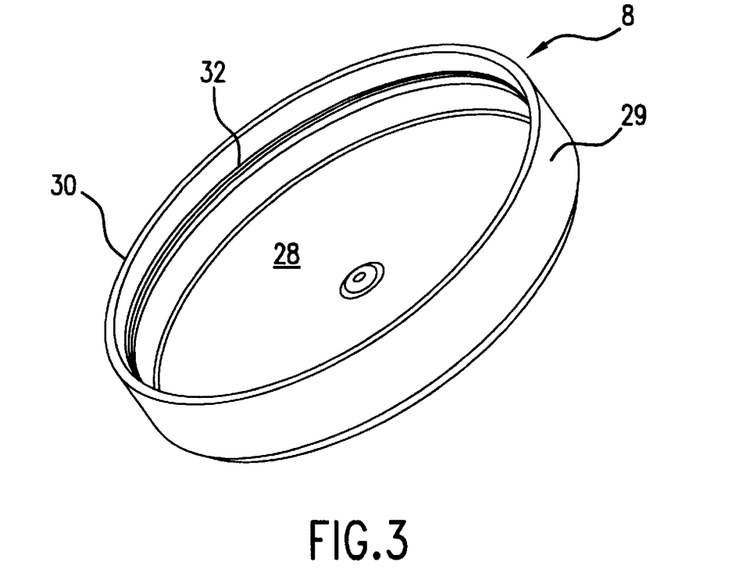
FIG. 3 is a perspective view of the cap of the bait station of FIG. 1.

Referring now in detail to the drawings, in which like reference characters indicate like parts throughout the several views, a preferred embodiment of a bait station 5 is illustrated in FIGS. 1–10. Referring first to FIG. 1, the bait station includes a cylindrically formed base section 7, and a correspondingly shaped cap 8. Preferably both the base section and the cap are formed of a plastic, for example polyethylene or polypropylene, or any other plastic suitable for use with pesticides, as well as suited for use in an indoor or outdoor service environment. It is anticipated that the bait station may be injection molded using conventional injection molding processes. It is also anticipated, however, that the bait station may be formed of any desired material and may be formed employing any desired and conventional manufacturing process.

Referring now to FIGS. 2, 4–5, and 8–10, the base section 7 is described in further detail. The base section is shown in bottom and top plan view, respectively, in FIGS. 4 and 5, and is formed to be cylindrical in shape having a planar floor 10 with a continuous upstanding sidewall 11 extending therefrom and along the periphery of the floor. The sidewall terminates in a top edge 12 for defining an open cylindrical top to the base section. As best shown in FIGS. 1, 2, 4, and 8, a series, in this instance four, radially spaced openings 14 are defined in the sidewall of the base section, and extend therethrough. These openings may be sized and shaped as desired for allowing passage of any insects, for example ants, roaches, or vermin, therethrough, and only one such sidewall opening need be provided. Moreover, although shown as being circular/cylindrical, each of the base section 7 and the cap 8 may be formed in any complementarily desired geometric shape, or size.

Positioned within the base section of the bait station, and preferably formed integrally as a part of the floor 10 thereof, is a bait cup 15. The bait cup is formed by a frustoconical sidewall 16 spaced from the sidewall of the base section, and extending upwardly for defining a bait receiving cavity 18, illustrated as being cylindrical in FIGS. 8 and 9, for holding a suitable insecticide or pesticide bait (not illustrated) therein. The frustoconical sidewall of the bait cup may be provided with a textured surface molded or formed thereon. For example, the textured surface could be made by sandblasting the inner surface if the mold used to form the base section and in particular the sidewall of the bait cup, so that insects may readily grasp the textured surface of the sidewall to assist the insects in climbing upwardly along the sidewall toward the bait receiving cavity, and the bait (not illustrated) held therein.

As illustrated, the base section is also provided with an annular ridge 19 formed or otherwise defined on the exterior sidewall thereof. The ridge 19 may extend continuously about the sidewall of the base section, or may be formed as a series of radially spaced ridge segments extending about the base section sidewall, as shown. The sidewall of the base section is also provided with a flange 20 formed on the exterior thereof and extending radially away therefrom. The flange extends about the sidewall of the base section, and is itself provided with a separate continuous upstanding sidewall 22 extending along the peripheral edge of the flange, the sidewall 22 being spaced from and parallel to the sidewall 11 of the base section. As illustrated in FIGS. 4–5, and 8–9, the exterior sidewall 11 of the base section, in concert with the flange 20 and the upstanding sidewall 22 thereof, together define a channel 23 which also extends about the periphery of the base section sidewall. As shown, the flange 20 is spaced intermediate the floor of the bait station, and the annular ridge 19 thereof.

Figure 4:
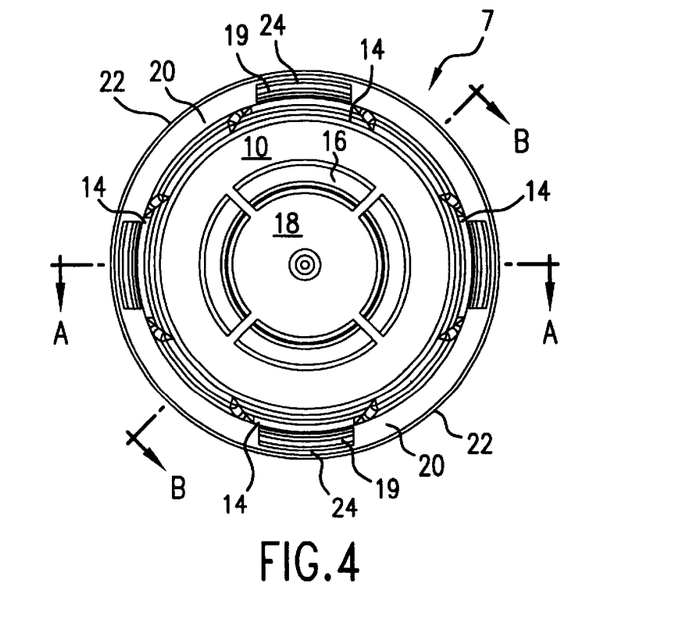
FIG. 4 is a bottom plan view of the base section of FIG. 2.
Figure 5:
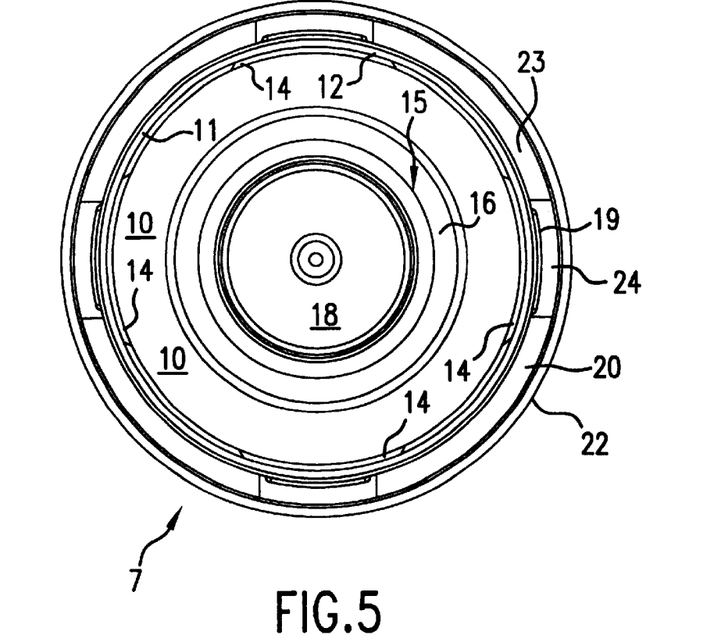
FIG. 5 is a top plan view of the base section of FIG. 2.
Figure 8:
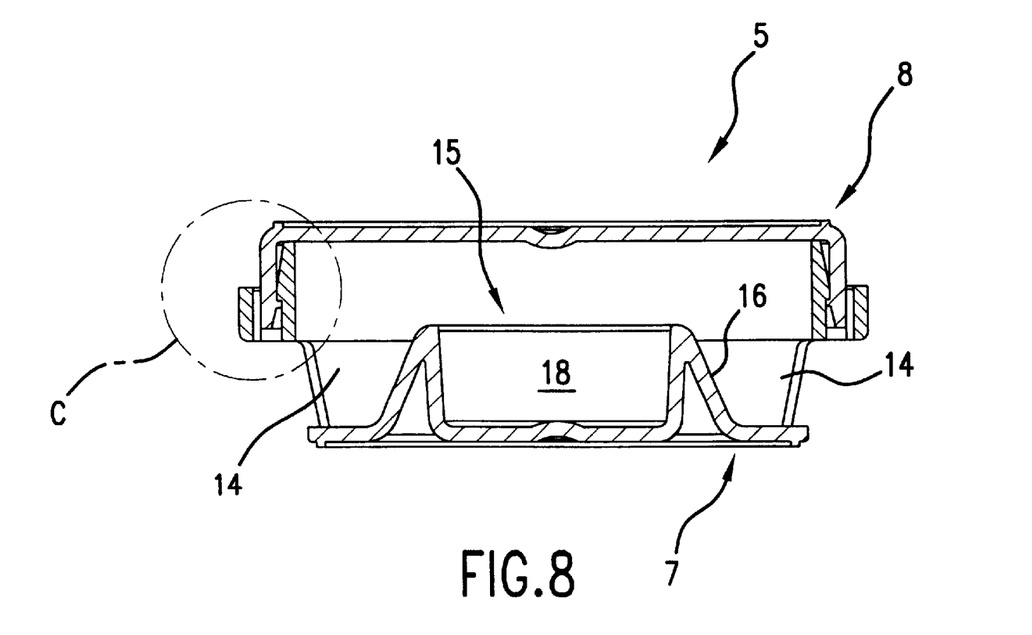
FIG. 8 is a side elevational view, in cross section, along line A—A of FIG. 4.
Figure 10:
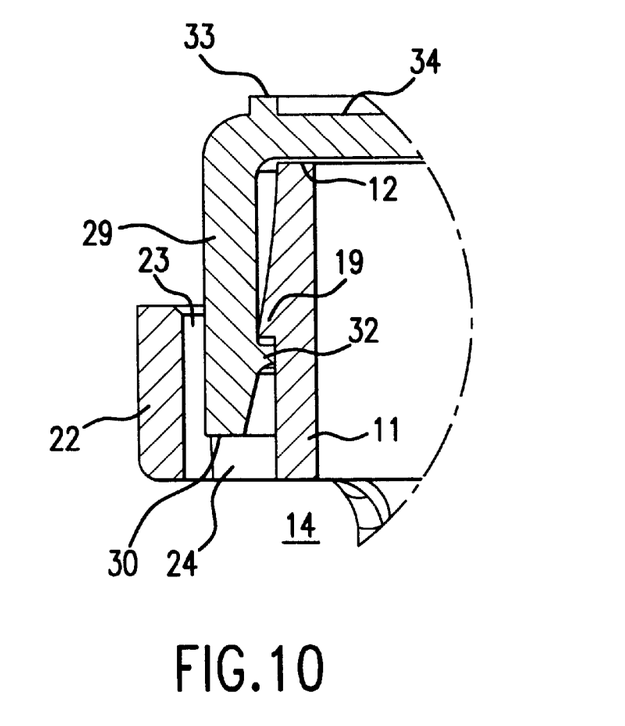
FIG. 10 is an enlarged partial detail view of the cap affixed to the base section of the bait station, taken along line C of FIG. 8.

Referring now to FIGS. 4, 5, and 8, several channel openings 24 are defined within the channel 23 formed by the flange and the flange sidewall, which openings are aligned, i.e., they are in registry, with the ridge segments 19 formed on the exterior sidewall of the base section. This results from the fact that the bait station is injection molded, and that the ridge sections 19 that form the snap ledge have an undercut, as shown in FIG. 10. The undercut overhangs the parting line of the base section mold that would otherwise prevent the base section from being ejected from the injection mold. Therefore, in order to allow the base section, and in particular the undercut flange 19 to be ejected from the mold, the mold is typically provided with moveable components known to those skilled in the art as "slides." The channel openings 24, however, allow the mold to form the undercut of the snap ledge or annular ridge 19 without a slide component, which thus reduces the overall production costs of the base mold or molds, and also decreases the individual piece price because the injection molding cycle time of the base section is less without having to use slide components.

With respect to the cap, the construction of which is described in greater detail below, and in particular with respect to the flange 32 (FIG. 10) thereof, here the undercut portion of the flange is designed to be "shallow," i.e., relatively small in size, and has angles with a radius that allows ejection of the cap from the injection mold without the need of a segmented, collapsible core, which, as known, is constructed to expand and collapse during the injection molding process. The shallow construction of the flange on the cap sidewall also has the effect of reducing the overall production cost of the cap mold, and also decreases the individual piece price because the injection molding cycle time of the cap is less without the use of a collapsible core. As constructed, therefore, the novel bait station of this invention allows for its manufacture via a simplified injection molding manufacturing process while also allowing for the reduction of piece prices to increase the efficiency of bait station manufacture.

Figure 6:
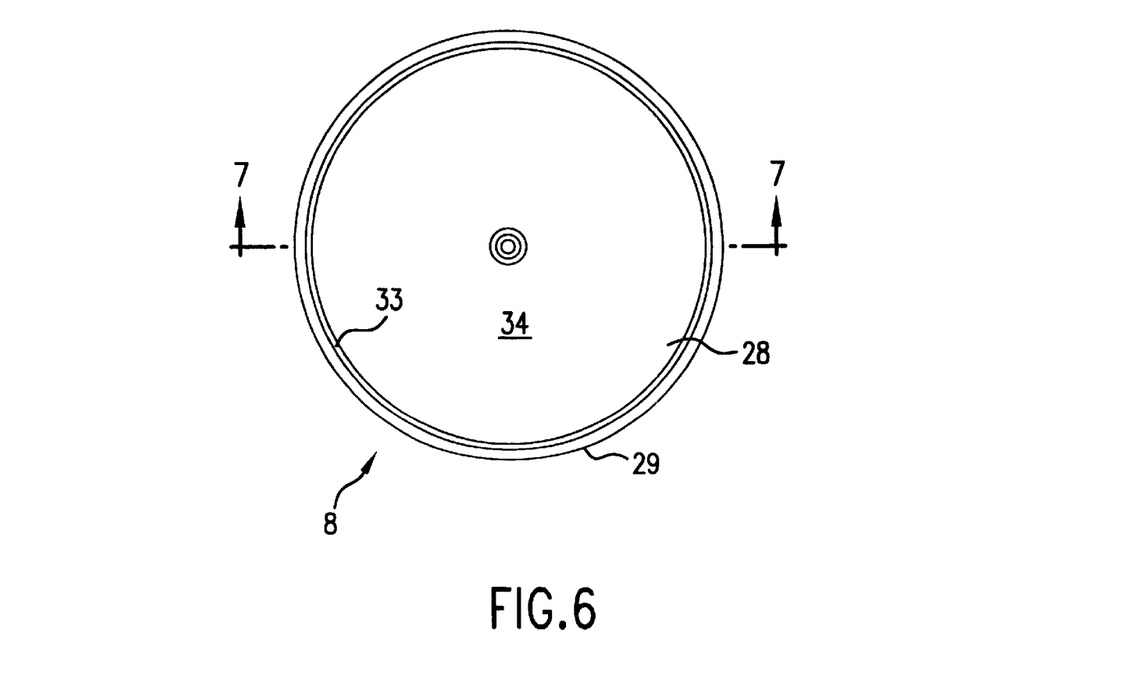
FIG. 6 is a top plan view of the cap of FIG. 3.
Figure 7:
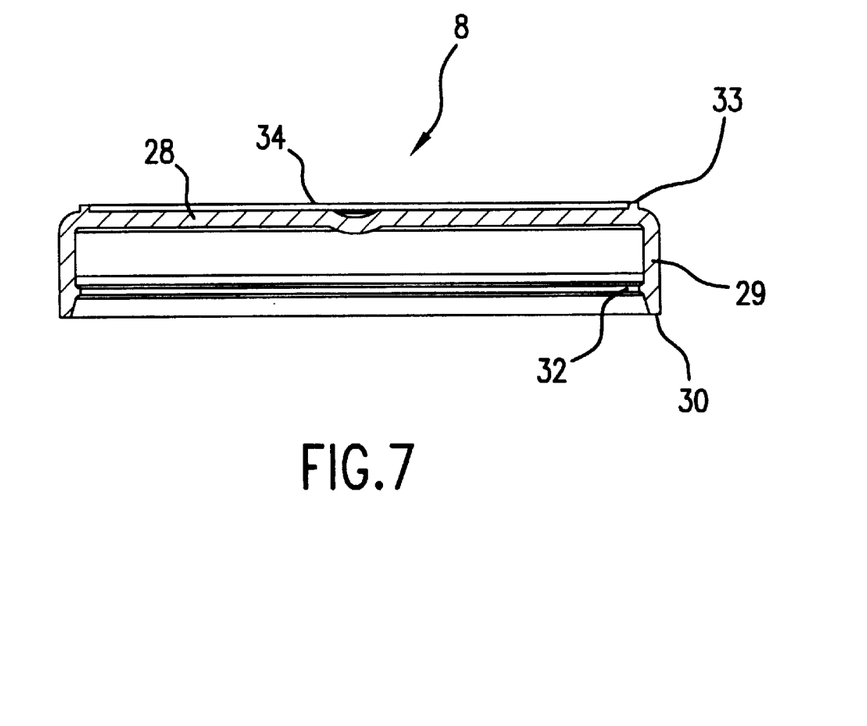
FIG. 7 is a side elevational view, in cross section, of the cap of FIG. 6.

Referring now to FIGS. 3, and 6–9, the cap 8 is formed of a planar member 28 of a corresponding geometric shape with respect to that of the floor 10 of the base section. A continuous cap sidewall 29 extends away from the planar member along the periphery thereof, and terminates in a leading edge 30 spaced from the planar member. Spaced intermediate the leading edge of the cap and the planar member is the locking flange 32, as described above, which is formed on the interior of the sidewall 29. As illustrated in FIGS. 6 and 7, a continuous lip 33 is also formed on the planar member opposite the sidewall 29, and extends about the periphery of the planar member. The lip extends about the top the cap's planar member, and is used to strengthen the cap so that it does not become too flexible during the handling and placement of the cap on the base section during the manufacture of the bait station. Additionally, the lip, in concert with the planar member, also forms a recessed surface 34 on the planar member for receiving any desired labels or markings, or upon which a suitable product indicator or advertisement may be molded as a part of the cap.

Figure 9:
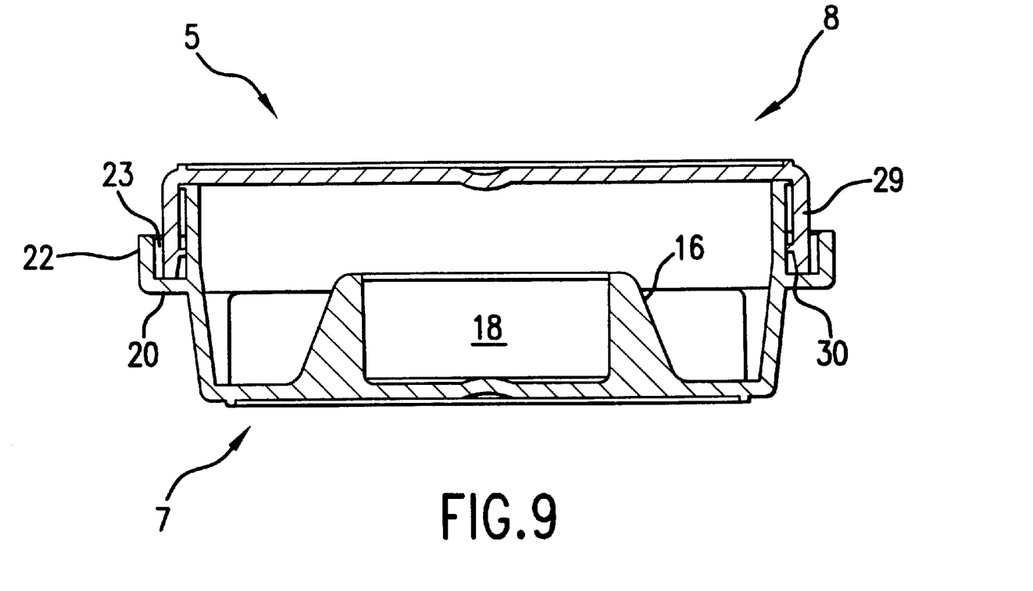
FIG. 9 is a side elevational view, in cross section, along line B—B of FIG. 4.

Referring now to FIGS. 8–10, the manner in which the cap is snap-fit to the base section of the bait station is illustrated in greater detail. The cap is aligned with the base section such that the leading edge 30 of the cap extends about the sidewall 11 of the base section, and is passed downwardly therealong toward and ultimately received within the channel 23 defined by the flange 20 and the flange sidewall 22. The annular flange 32 defined on the interior of the cap is sized and shaped to be passed over the annular ridge 19, or ridge segments, formed on the exterior sidewall of the base section. As the cap is preferably constructed of a resilient or flexible plastic material, for example, polyethylene, the cap sidewall 29 flexes as the flange 32 is passed over the ramped surface of the ridge 19 so that once the flange passes over the ridge, the cap sidewall snaps back into its original shape and positions the flange 32 beneath the ridge 19. Thereafter the cap cannot be drawn upwardly off of the base section, it being intended that the cap will be permanently affixed to the base section in this manner.

As the cap is received on the base section, the planar member 28 thereof is received on the top edge 12 of the base sidewall, and is supported thereby. Simultaneously, and as best shown in FIG. 9, the leading edge 30 of the cap is received on or against the flange 20 within the channel 23, such that the cap is supported entirely by the sidewall of the base section, primarily through the top edge 12, and the flange 20.

By passing the leading edge of the cap into the channel about the periphery of the base section sidewall and against the flange 20, access to the leading edge 30 of the cap sidewall is denied. Accordingly, a person would have a great deal of difficulty in taking a screwdriver or a knife blade, for example, and placing the instrument between the leading edge of the cap and the flange in order to try to twist the cap up and off of the base section for obtaining access to the bait held therein. Moreover, as the cap is supported by the sidewall of the base, the cap is capable of bearing a greater degree of top loading than existing bait stations on the market, without otherwise being crushed. Also, as the bait station, and in particular the base section and cap thereof, are preferably injection molded plastic, versus a thermo-formed plastic for example, the strength and crush resistance of the bait station is improved.

In addition, the snap-fit construction of the bait station eliminates the need to radio frequency ("RF") weld or ultrasonically weld the cap to the base which is the method currently used by a great many bait station manufacturers. The elimination of this welding step reduces manufacturing equipment costs, and allows for a continuous manufacturing operation. The use of RF or ultrasonic welding would also require that the bait station be stopped under the welding device for the required period of time in order to complete the welding step, resulting in a non-continuous manufacturing operation which would have the effect of increasing manufacturing time, and thus manufacturing costs.

The openings 14 defined within the sidewall of the base section are formed during the injection molding process as well, which eliminates several manufacturing steps. This is especially noteworthy when compared to thermo-formed bait stations, in which the parts of the bait station are required to be punched first to separate the parts from the webbing formed with the parts, and a second punching step is needed to punch out the entrance doors or openings within the cap and/or base, respectively, whereupon the cap is then welded to the base.

It is anticipated that any solid chemical bait formulation can be used within the bait station, and may be of any type, size, and shape so long as it is fit within the bait cup 15. The bait cup 15, as well as the bait station itself, is capable of being manufactured in any desired size or shape for receiving the requisite amount of bait therein, and for the size and number of the particular pest being treated.

Although preferred embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed above, and that many modifications and other embodiments are intended to be included within the scope of the invention. Moreover, although specific terms are employed herein, they are used only in a generic and descriptive sense, and not for the purposes of limiting the described invention, and the words "a," "and," or "the" can mean one or more, depending upon the context in which the terms are employed.

I claim:

1. A bait station, comprising:
   a base section, the base section having a floor, a continuous upstanding sidewall extending along the periphery of the floor and a flange formed on the exterior of the sidewall and extending radially away therefrom, the flange being spaced from the floor of the base section and extending at least partially about the base section sidewall;
   at least one opening defined within the sidewall;
   a bait cup disposed on the floor of the base section; and
   a cap constructed and arranged to be received on the base section in a snap-fit;
   wherein a leading edge of the cap is received against the flange when the cap is snap-fit to the base section.

2. The bait station of claim 1, the bait cup being formed as a part of the floor of the base section.

3. The bait station of claim 1, the bait cup having a frustoconical outer sidewall extending upwardly from the base section floor and defining a bait receiving cavity.

4. The bait station of claim 3, the frustoconical sidewall of the bait cup having a textured surface, whereby an insect may grasp the textured surface to assist the insect in climbing along the frustoconical sidewall to gain access to the bait receiving cavity.

5. The bait station of claim 3, the frustoconical sidewall of the bait cup being spaced from the base section sidewall.

6. The bait station of claim 1, further comprising a radially spaced series of openings defined within base section sidewall.

7. The bait station of claim 1, the base section further comprising an annular ridge formed on the exterior surface of the sidewall spaced from the base section floor, the ridge extending at least partially about the sidewall of the base section, and the cap having an annular flange sized and shaped to be passed over the annular ridge for locking the cap on the base section in the snap-fit.

8. The bait station of claim 7, the base section sidewall ridge comprising a radially spaced series of ridge segments.

9. The bait station of claim 7, the cap comprising a planar member and a continuous sidewall extending away therefrom along the periphery of the planar member, the annular flange of the cap being defined on the interior surface of the cap sidewall and spaced from the planar member thereof.

10. The bait station of claim 9, the cap sidewall being constructed and arranged to be yieldably passed over the base section sidewall ridge.

11. The bait station of claim 9, the cap being manufactured of a resilient material.

12. The bait station of claim 1, further comprising a continuous upstanding sidewall extending along the periphery of said flange for defining a channel about the exterior of the base section sidewall.

13. The bait station of claim 12, wherein the leading edge of the cap is received within the channel when the cap is snap-fit to the base section.

14. The bait station of claim 1, said cap comprising a planar member and a continuous sidewall extending away therefrom along the periphery of said planar member, said leading edge being spaced from the planar member and extending along the periphery of the cap sidewall.

15. The bait station of claim 1, said base section sidewall flange comprising a radially spaced series of flange segments.

16. The bait station of claim 1, the base section further comprising an annular ridge formed on the exterior surface of the sidewall spaced from the base section floor, said ridge extending at least partially about the sidewall of the base section, and the cap having an annular flange sized and shaped to be passed over the annular ridge for locking the cap on the base section in the snap-fit.

17. The bait station of claim 16, the annular ridge on the sidewall of the base section base section being spaced from the base section sidewall flange.

18. The bait station of claim 16, the cap comprising a planar member and a continuous sidewall extending away therefrom along the periphery of the planar member, the leading edge of the cap extending along the periphery of the cap sidewall and being spaced from the planar member, the annular flange of the cap being defined on the interior surface of the cap sidewall intermediate said planar member and the leading edge of the cap.

19. The bait station of claim 1, the cap comprising a planar member, a continuous sidewall extending away therefrom and extending along the periphery of said planar member, and a leading edge extending along the periphery of the cap sidewall and being spaced from the planar member.

20. The bait station of claim 19, the cap further comprising a lip formed on the planar member and extending along a peripheral edge thereof opposite the cap sidewall.

21. The bait station of claim 19, wherein the sidewall of the cap is passed about and at least partially along the base section sidewall when the cap is snap-fit to the base section, and wherein said planar member is received on and supported by a top edge of the base section sidewall.

22. The bait station of claim 19, wherein the cap is supported by the base section sidewall when the cap is snap-fit to the base section.

23. The bait station of claim 1, wherein the bait station is manufactured of a plastic material.

24. The bait station of claim 1, wherein the bait station is injection molded.

25. A bait station, comprising:
    a base section, the base section having a floor, a continuous upstanding sidewall extending along the periphery of the floor, an annular ridge formed on the exterior surface of the sidewall spaced from the floor, the ridge extending at least partially about the sidewall of the base section, and a flange formed on the exterior of the base section sidewall spaced from said annular ridge and extending at least partially about the base section sidewall and radially away therefrom,
    at least one opening defined within the sidewall;
    a bait cup disposed on the floor of the base section; and
    a cap, the cap having an annular flange sized and shaped to be passed over the annular ridge for locking the cap on the base section in a snap-fit;
    wherein a leading edge of the cap is constructed and arranged to be received against the base section sidewall flange once the cap is snap-fit to the base section.

26. The bait station of claim 25, further comprising a continuous upstanding sidewall extending along the periphery of the base section sidewall flange for defining a channel about the exterior of the base section sidewall, the leading edge of the cap being received within the channel when the cap is snap-fit to the base section.

27. A bait station, comprising:
    a base section, the base section having a floor and a continuous upstanding sidewall extending along the periphery of the floor;
    at least one opening defined within the sidewall;
    a bait cup disposed on the floor of the base section;
    a flange formed on the exterior of the base section sidewall, said flange being spaced from the floor of the base section and extending at least partially about, and radially away from, the base section sidewall;
    a cap sized and shaped to be passed over the base section and received thereon; and
    a continuous upstanding sidewall extending along the periphery of the base section sidewall flange and defining a channel about the exterior of the base section sidewall;
    wherein a leading edge of the cap is received against the base section sidewall flange and within said channel once the leading edge of the cap is received on the base section.

28. The bait station of claim 27, the cap comprising a planar member and a sidewall extending away therefrom, the cap sidewall being passed about and at least partially along the base section sidewall and the planar member of the cap being supported by a top edge of the base section sidewall when the cap is received on the base section.

29. A bait station, comprising:
    a base section, the base section having a floor and a continuous upstanding sidewall extending along the periphery of the floor;
    a flange formed on the exterior of the sidewall and extending away therefrom, the flange being spaced from the floor of the base section and extending at least partially about the base section sidewall;
    at least two radially spaced openings defined within base section sidewall;
    a bait cup disposed on the floor of the base section, the bait cup defining a bait receiving cavity; and
    a cap constructed and arranged to be received on the base section in a snap-fit, so that the cap is spaced from the bait cup and supported by and on the base section sidewall, and a leading edge of the cap is received against the flange, when the cap is snap-fit to the base section.

30. The bait station of claim 29, wherein a sidewall of the cap is passed about and at least partially along the base section sidewall when the cap is snap-fit to the base section, and the remainder of the cap is supported on a top edge of the base section sidewall.

* * * * *

UNITED STATES PATENT AND TRADEMARK OFFICE
CERTIFICATE OF CORRECTION

PATENT NO.    : 6,594,948 B1
DATED         : July 22, 2003
INVENTOR(S)   : Michael W. Novack It is certified that error appears in the above-identified patent and that said Letters Patent is hereby corrected as shown below:

Column 9,
Lines 1-3, the second occurrence of "base section" is deleted so that Claim 17 reads as follows:
17. The bait station of claim 16, the annular ridge on the sidewall of the base section being spaced from the base section sidewall flange.

Signed and Sealed this

Twenty-third Day of December, 2003

JAMES E. ROGAN
*Director of the United States Patent and Trademark Office*